(12) United States Patent
Verhaege et al.

(10) Patent No.: US 6,342,673 B1
(45) Date of Patent: Jan. 29, 2002

(54) METHOD OF MAINTAINING A SUPERCONDUCTING CRYOLINK AT LOW TEMPERATURE

(75) Inventors: Thierry Verhaege, Saulx les Chartreuses; Peter Friedrich Herrmann, Corbeuse; Francois Moisson-Franckhauser, Bretigny sur Orge, all of (FR)

(73) Assignee: Nexans, Paris (FR)

( * ) Notice: Subject to any disclaimer, the term of this patent is extended or adjusted under 35 U.S.C. 154(b) by 0 days.

(21) Appl. No.: 09/261,175

(22) Filed: Mar. 3, 1999

(30) Foreign Application Priority Data

Mar. 5, 1998 (FR) ................................. 98 02683

(51) Int. Cl.⁷ ............................................. H01B 12/16
(52) U.S. Cl. .................... 174/15.5; 174/15.4; 174/15.5; 505/885; 505/886; 505/889; 505/890
(58) Field of Search ................ 174/15.4, 15.5; 505/885, 886, 890, 899, 901, 898; 62/467, 502, 608, 51.1

(56) References Cited

U.S. PATENT DOCUMENTS

| 3,343,035 A | | 9/1967 | Garwin .................. 174/15.5 X |
| 3,864,926 A | * | 2/1975 | Collins ........................ 62/608 |
| 3,878,691 A | * | 4/1975 | Asztalos ...................... 62/467 |
| 4,189,930 A | * | 2/1980 | Davydov et al. ............. 62/502 |
| 4,845,308 A | | 7/1989 | Womack et al. ........... 174/15.4 |
| 4,947,007 A | * | 8/1990 | Dew et al. ................. 174/15.5 |
| 4,992,623 A | * | 2/1991 | Briley et al. ............... 174/15.4 |
| 6,112,531 A | * | 9/2000 | Yamaguchi ................. 62/51.1 |

* cited by examiner

Primary Examiner—Albert W. Paladini
(74) Attorney, Agent, or Firm—Sughrue Mion, PLLC

(57) ABSTRACT

Method of maintaining a superconducting cryolink at low temperature by a flow of liquid nitrogen produced by a liquefier feeding one end of a link section, wherein the section is fed by a single liquefier and nitrogen is drawn off from at least one intermediate point of the link section.

11 Claims, 6 Drawing Sheets

US 6,342,673 B1

METHOD OF MAINTAINING A SUPERCONDUCTING CRYOLINK AT LOW TEMPERATURE

The present invention concerns the field of transporting electricity by means of a superconducting link.

BACKGROUND OF THE INVENTION

In the prior art, electricity is transported by a superconducting cable having superconducting link sections at a temperature which is held much lower than 90 K to maintain the superconducting state of the cable and to prevent the nitrogen from boiling.

FIGS. 1 to 3 show the usual architecture of equipment for transporting current short distances by means of links cooled by liquid nitrogen. Prior art equipment of the above kind includes a set of liquid nitrogen refrigerators (1) arranged equidistantly along the installation. The same flowrate $m_0$ of liquid nitrogen circulates in the go pipe (2) and in the opposite direction in the return pipe (3). The temperatures in the go and return pipes are 70K and 80K, for example.

In the example shown in FIG. 1 two pipes (2, 3) which are thermally insulated from each other are of length $2L_a$, and the distance between two consecutive refrigerators is therefore $2L_a$. FIGS. 2 and 3 show two prior art variants. The operating characteristics are unchanged in the case shown in FIG. 2 of a link half-section of length $L_a$ fed by a single refrigerator, the liquid nitrogen flowing in a loop having a developed length $2 \times L_a$. In the remainder of the description this variant serves as a reference.

The prior art architectures have the drawback of requiring a multiplicity of refrigerators disposed along the link.

OBJECTS AND SUMMARY OF THE INVENTION

The aim of the invention is to overcome this drawback by proposing a method and a link architecture with sections having a length in the order of 100 km, or even several hundred kilometers, the investment and maintenance costs of which are low. To this end, the invention aims to reduce the number of liquefiers and more precisely to replace the multiplicity of low-capacity refrigerators distributed all along each section with a higher capacity liquefaction center and additional means for maintaining the operating temperature of the superconducting cable.

To this end, the invention firstly provides a method of maintaining a superconducting cryolink at low temperature by means of a flow of heat-conducting fluid such as liquid nitrogen produced by a liquefier feeding one end of the link section, wherein the section is fed by a single liquefier and wherein nitrogen is drawn off from at least one intermediate point of the link section.

The liquefier feeds the upstream end of the section with a flow of liquid nitrogen at high pressure, for example 10 atmospheres, to compensate for head losses along the section. All along the section, small quantities of liquid nitrogen are drawn off and expanded in order to reduce the temperature locally. The evaporated nitrogen can be returned to the liquefier via a large-section pipe or tubular member that is not thermally insulated. The evaporated nitrogen can also be ejected to the atmosphere, possibly after heating.

The above method in accordance with the invention imposes a significant limit on the pressure and/or the cross section of the section and/or the number of liquefiers.

In a first variant nitrogen is drawn off in a section including a go pipe and a return pipe by means of a plurality of draw-off stations including a heat exchanger for cooling both pipes.

In a second variant nitrogen is drawn off at a point upstream of the section and a bath of liquid nitrogen is maintained around a heat exchange wall surrounding the pipes.

In a third variant nitrogen is drawn off at a plurality of points distributed along a section comprising a single pipe.

In a fourth variant the pipes are separated in the upstream part of the section and are grouped together at the downstream end of the section.

The upstream pressure of the heat-conveying fluid is advantageously substantially equal to 10 bars.

The invention also provides equipment for transporting electric power via a superconducting cable comprising a pipe surrounding the superconducting cable for circulating a heat-conveying fluid at very low temperature and a liquefier for feeding said pipe, the equipment including at least one draw-off device for drawing off some of the heat-conveying fluid downstream from the liquefier.

The equipment of the invention preferably includes a plurality of draw-off devices each including a heat exchanger.

Advantageously, the downstream part of the pipe has a draw-off orifice fitted with a valve controlled by means for controlling the level of the heat-conveying fluid drawn off, said orifice communicating with a tubular member surrounding the pipe and having an orifice at its upstream end for ejecting gaseous fluid.

BRIEF DESCRIPTION OF THE DRAWINGS

The invention will be better understood after reading the following description, which is given with reference to the drawings, in which.

MORE DETAILED DESCRIPTION

Figure 1:
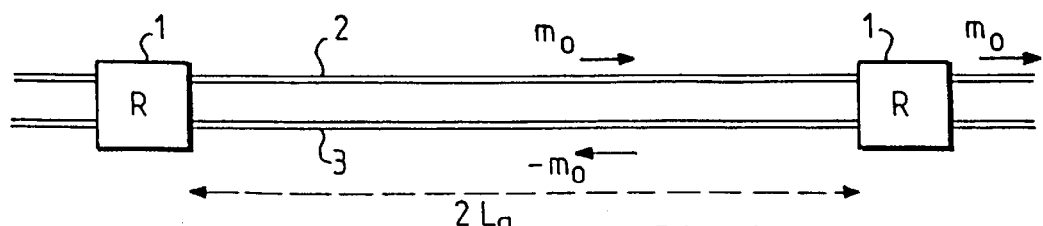
FIGS. 1 to 3 are diagrammatic views of art architectures.
Figure 2:
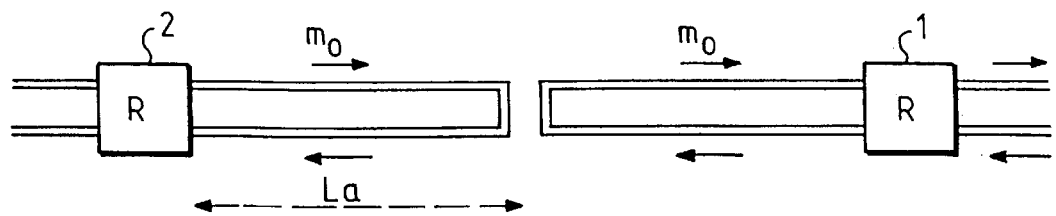
Figure 3:
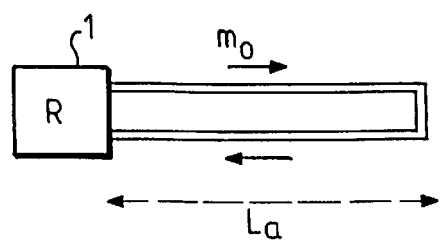
Figure 4:
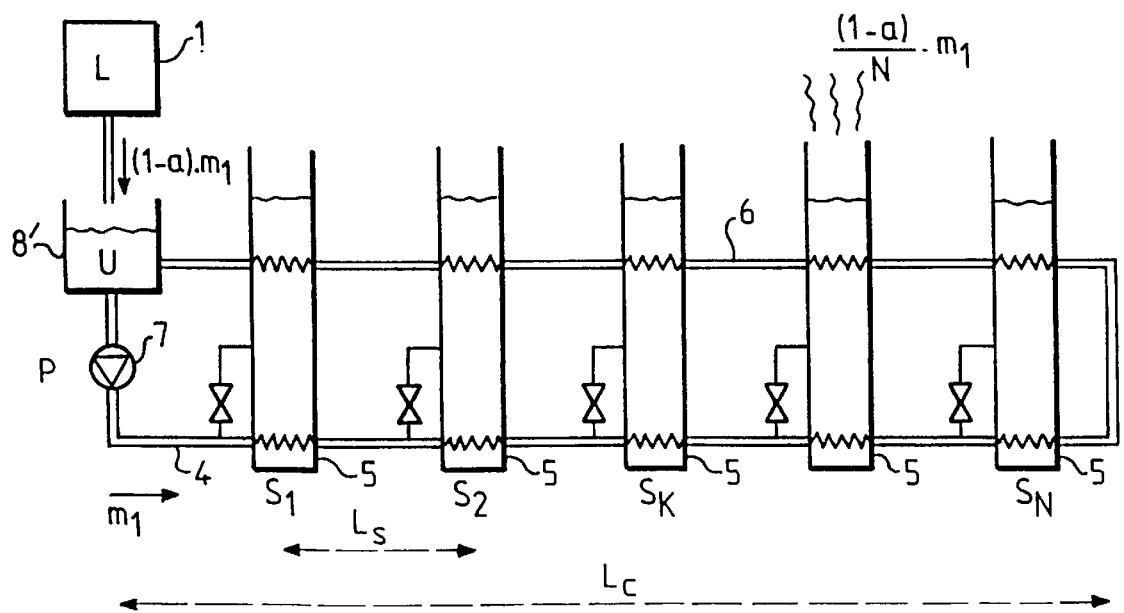
FIG. 4 is a diagrammatic view of a connecting element with two parallel pipes.

FIG. 4 is a diagrammatic view of a link half-section based on two parallel pipes (4, 6).

The pipe (4) is fed with liquid nitrogen by a liquefier (1) connected to a liquid nitrogen tank (8). The half-section has a length $L_c$ and is divided into N equal sectors of length $L_s$. Between two consecutive sectors a small portion of the nitrogen flowing in the go pipe (4) is expanded to atmospheric pressure by a draw-off of station (5). The exchange of heat between the nitrogen bath obtained in this way at 77K and the go and return pipes (4) and (6) reduces the temperature of the two pipes (4, 6) and causes all of the nitrogen drawn off from the go pipe (4) to boil. Nothing is drawn off from the return pipe (6). The remaining nitrogen that has not been drawn off in the go pipe (4) decreases in flowrate from $m_1$ to $(a.m_1)$ in the go pipe (4) by N step changes of the same value. The flowrate in the return pipe (6) remains equal to $(a.m_1)$ The half-section also includes a circulating pump (7) the flowrate of which is $m_1$. It circulates liquid nitrogen from the liquefier (1) with a flowrate $(1-a).m_1$ and from the return pipe (6) with a flowrate $(a.m_1)$.

The losses to be evacuated are proportional to the length $L_c$ of the half-section. The total flowrate $(1-a).m_1$ drawn off and ejected in gaseous form at 77K allows for the same losses as a flow of liquid approximately 10 times greater at between 70K and 80K.

To allow for seasonal variation in losses and refrigerating capacity, recycling at a rate of 30% or more is recommended. The distance between draw-off points (5) must be directly proportional to the return flowrate $(a.m_1)$.

The maximum distance $L_s$ between two consecutive draw-off points is determined by the fact that heating is limited to 82K–77K in each sector of the return path carrying the reduced flowrate $(a.m_1)$.

Figure 5:
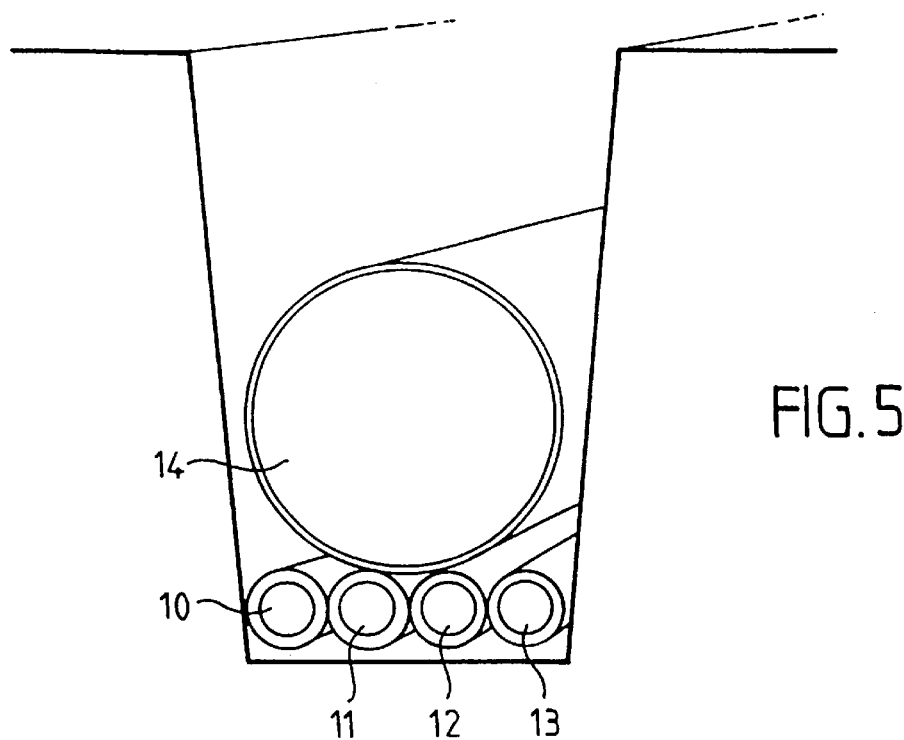
FIG. 5 is a sectional view of a link section.

FIG. 5 is a sectional view of a link section. In this embodiment the section is made up of four superconducting cables (10 to 13) and a pipe (14) for the return flow of nitrogen from the draw-off stations.

Figure 6:
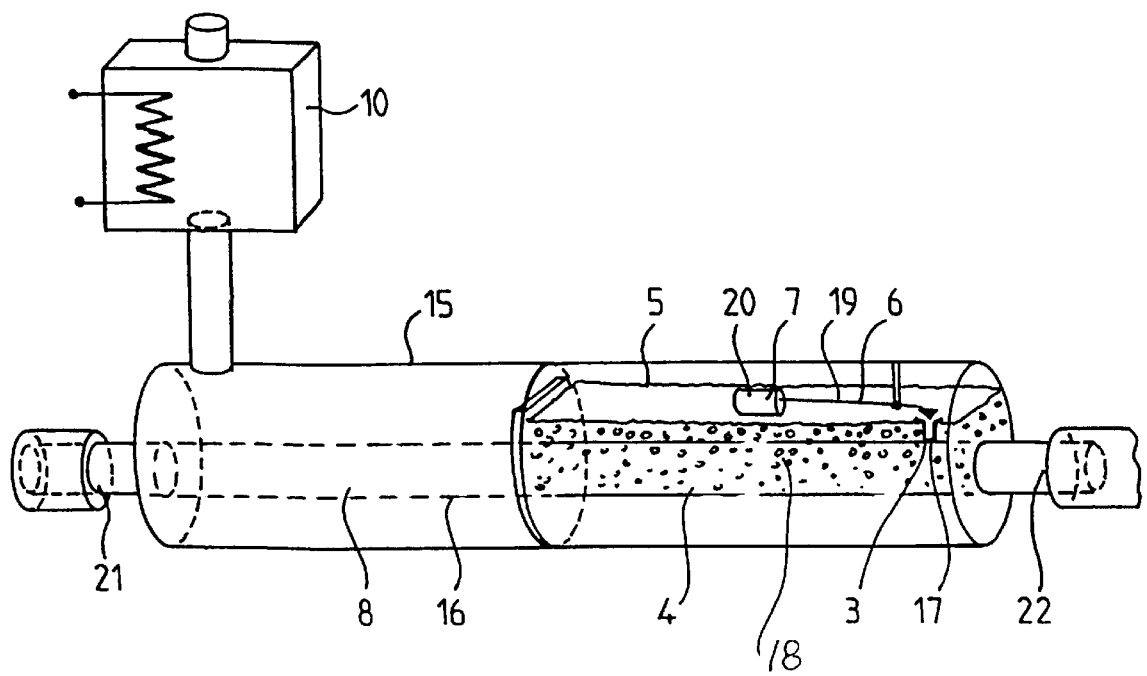
FIG. 6 is a diagrammatic view of the draw-off device between sectors of a link.

FIG. 6 is a diagrammatic representation of the draw-off device between sectors of a link.

The draw-off device surrounds section k of the go pipe 4. The downstream section (21) carries a flowrate m(k) of liquid nitrogen at a maximum temperature of 82K.

The upstream section (22) carries a flowrate m(k+1) of liquid nitrogen at a minimum temperature 77K.

The draw-off device is formed of a tubular sleeve (15) separated from the pipe by a heat exchange wall having a draw-off orifice (17). The draw-off orifice (17) allows a liquid nitrogen flowrate of m(k)–m(k+1). The liquid nitrogen that escapes via the draw-off orifice (17) expands in the tubular sleeve (15) to form a bath (18) of nitrogen boiling at 77K. A regulator device (19) including a plunger (20) maintains a constant level of boiling nitrogen in the bath.

Figure 7:
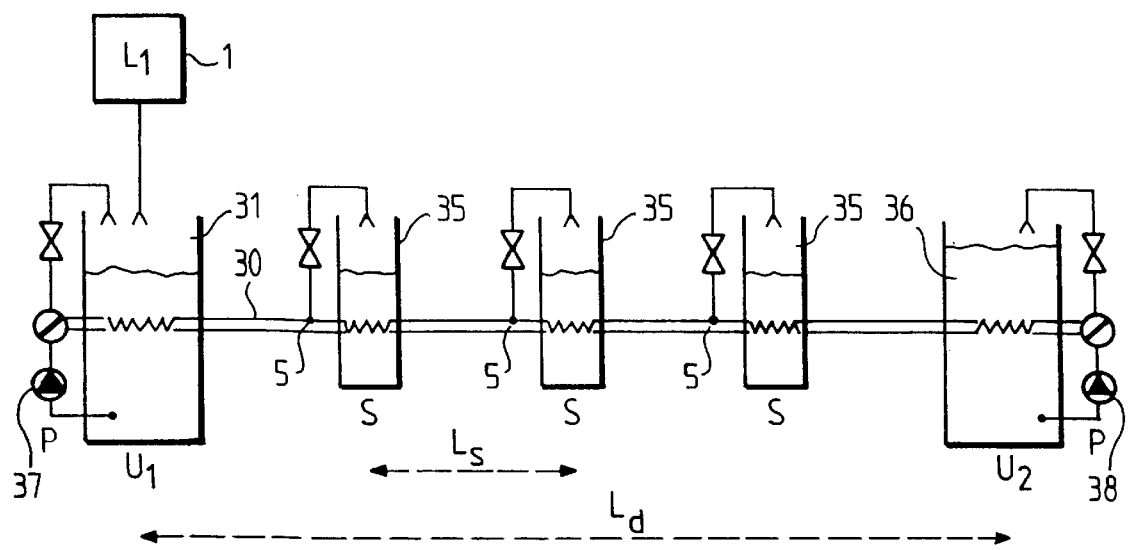
FIG. 7 is a diagrammatic view of an installation including a single pipe and distributed draw-off stations.

FIG. 7 is a diagrammatic view of an installation including a single pipe and a plurality of distributed draw-off stations.

The single pipe section (30) is fed by a single liquefier via an upstream tank of liquid nitrogen at 77K and at atmospheric pressure. The installation comprises a plurality of draw-off points (5) connected to draw-off stations (35) regularly spaced to form sectors of length $L_s$. The section also has a downstream tank (36).

Circulating pumps (37, 38) are provided for circulating the liquid nitrogen drawn from the respective tanks (31, 36).

When one of the tanks (31, 36) is full the direction of flow of the liquid nitrogen is reversed.

Figure 8:
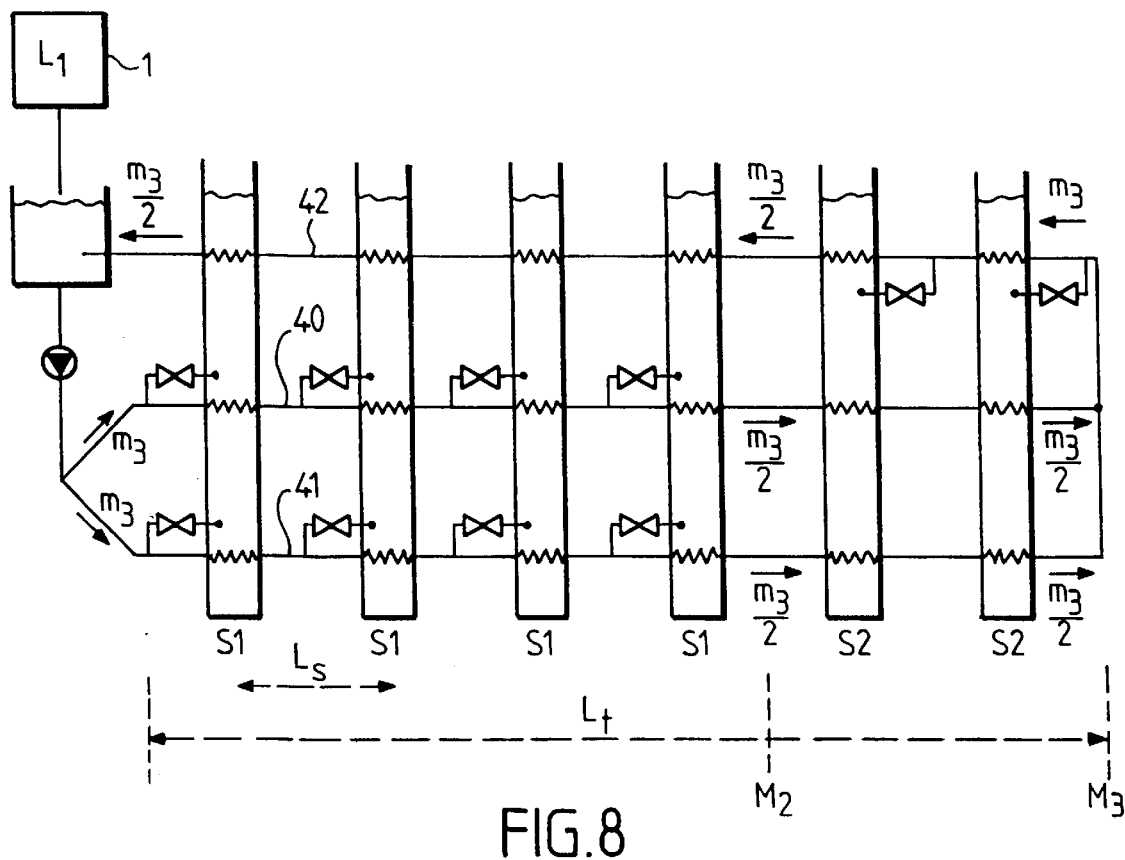
FIG. 8 shows a link half-section with three pipes including distributed draw-off stations.

FIG. 8 shows a link half-section (3) with pipes incorporating distributed draw-off stations. The half-section concerned is fed by a single nitrogen liquefier (1) for a length $L_t$. It comprises two go pipes (40, 41) and one return pipe (42). The half-section is segmented into N sectors separated by nitrogen draw-off points. The upstream flowrates common to the two go pipes (40, 41) are denoted $m_3$. Two-thirds of the way along the go path, both flowrates remain constant and equal, with a value of approximately 0.5 $m_3$. They are then combined in a single return pipe (42) with a flowrate that decreases from $m_3$ to 0.5 $m_3$ over the first third of the return path, after which the flowrate is constant at 0.5 $m_3$ as far as the single liquefier concerned.

Accordingly, over all of the path, the presence of one or two pipes in which the flowrate is a minimum flowrate (0.5 $m_3$) means that the draw-off points must remain equidistant to assure identical heating of all the sectors. The flowrate evaporated to maintain the temperature of the pipes with a global length of 3 $L_t$ with draw-off is deduced from the flowrate $m_0$ for maintaining the low temperature of a reference pipe of length $L_a$ with no draw-off.

Figure 9:
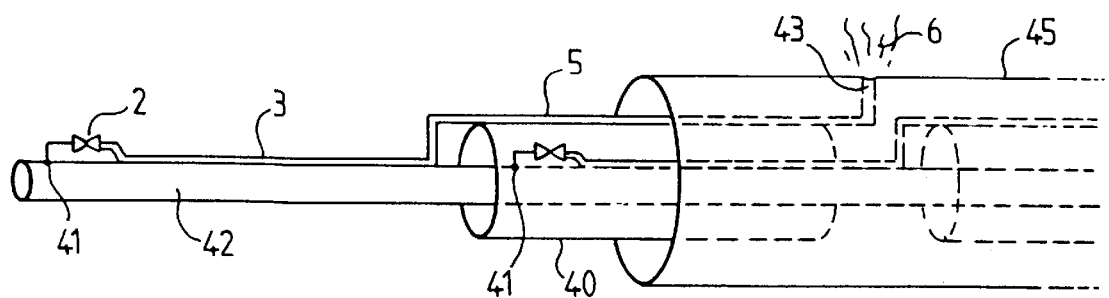
FIG. 9 is a diagrammatic view of a continuous draw-of section.

FIG. 9 is a diagrammatic representation of a section with continuous draw-off.

In the previous variants, the nitrogen was drawn off at a plurality of regularly spaced points. In these variants the draw-off stations are separated by sectors comprising 1, 2 or 3 pipes thermally insulated from each other. In the installation shown in FIG. 9, draw-off is continuous. The exchangers are replaced by pipes (40) arranged all along the link, in thermal contact with the pipes (42) containing the cables. The nitrogen drawn off is expanded at the upstream end (41) of each element of the pipe (40) and travels the length of the pipe (40) until gaseous nitrogen is obtained, before it is ejected at atmospheric pressure via an exhaust (43). An enclosure (45) surrounds the complete installation. The enclosure (45) is at ambient temperature.

This variant avoids the use of draw-off stations using heat exchangers. It also allows thermal contact between the parallel pipes containing the cables.

It further avoids axial change in the temperature between 77K and 82K along the sectors. The temperature of the superconducting cables continues to be subject to a ceiling around 77K instead of 82K, which guarantees improved performance.

Figure 10:
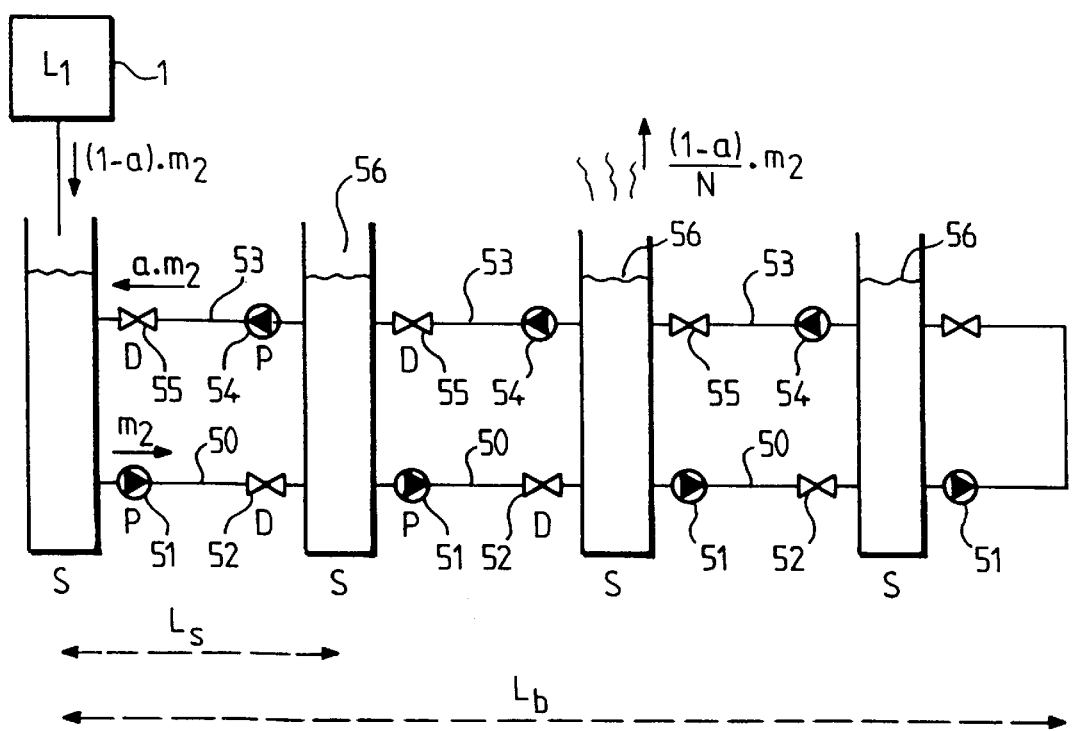
FIG. 10 is a diagrammatic view of a half-section with two pipes and global expansion.

FIG. 10 is a schematic representation of a half-section with two pipes and global expansion. In this variant each half-section is segmented into N sectors of unequal length. The longer sectors are at the end opposite that at which the liquefier (1) is located.

Between two consecutive sectors k–1 and k is a bath of liquid nitrogen at 77K and at atmospheric pressure.

Each of the go sectors (50) carries the same flowrate $m_2$ of liquid nitrogen independent of the value of k. At the upstream end of each go sector (50) a cold circulator (51) imposes a pressure $p_0$ on the flowrate of liquid nitrogen drawn at 77K from bath k–1. At the downstream end of this sector all the liquid nitrogen, the downstream pressure of which exceeds 3 bars and the downstream temperature of which does not exceed 82K, is expanded to atmospheric pressure by an expansion unit (52). This flow of expanded nitrogen feeds the next bath k.

Each of the return sectors (53) also has a cold circulator (54) at its end k+1 and an expansion unit (55) at its end k.

Nitrogen bath (56) k is fed by two pipes: the kth go pipe (50) and the (k+1)th return pipe (53). The total losses evacuated by the ejection of gaseous nitrogen above the bath are proportional to the sum of the lengths of the two incoming pipes. The flowrate of nitrogen in the return pipe (53) decreases in successive steps from a maximum value $m_2$ at the end opposite the liquefier (1) to a recycling value $a.m_2$ at the end fed by the liquefier (1). This variant avoids accumulation of the head losses in the successive sectors.

In theory there is no limit on the length of link that can be fed from a liquefier at the end provided that:

the length $L_s$ of each sector carrying the common go flow, proportional to the total length $L_b$ of the link, is limited so that head losses do not exceed ($p_0$–3 bars); and heating of the return pipe, in which the flowrate is reduced in steps to a recycling flowrate a.m$_2$, continues to be subject to a ceiling of 82K–77K.

Figure 11:
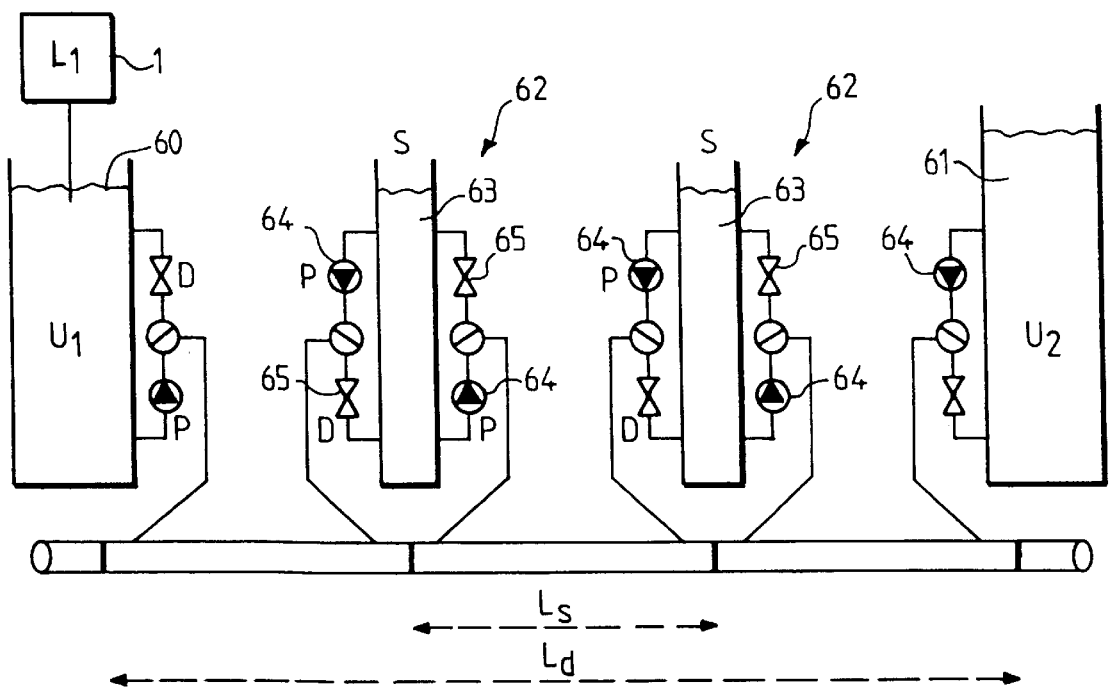
FIG. 11 is a diagrammatic view of a link with a single pipe, flow reversal, and distributed expansion.

FIG. 11 is a schematic representation of a link with a single pipe, flow reversal and distributed expansion. The link includes a set of spaced liquefiers (1) and tanks (60, 61) at both ends of the link. The partial flowrate reaching the downstream end of the link feeds the downstream tank (61) with liquid nitrogen at 77K and at atmospheric pressure. When the downstream tank (61) is full the direction of flow of the liquid nitrogen in the link is reversed. Unlike the variants with multiple draw-off, the upstream flowrate is no longer limited by the sum of the head losses in all sectors, but by the global head loss referred to a single sector. This allowed increase in the upstream flowrate and in the distance between liquefiers means that the unit length of the sectors can be increased without exceeding the heating limit along each sector. This halves the cryogenics required, if a single enclosure is sufficient to contain the cryocable, instead of two enclosures of the same diameter as the previous one. The length of a link section between a liquefier (1) and a tank (61) at the end is denoted $L_d$. Two end-to-end sections can be used in a head-to-tail arrangement, forming a system of length 2.$L_d$ between liquefiers, using a common tank at the center where x=$L_d$.

Each section is subdivided into a sum of sectors. The length $L_s$ of a sector:
must have a critical length $L_{s1}$ for which the heating under steady state conditions is equal to half the critical heating (this heating is doubled at the moment of reversing the flow of nitrogen); and
must have a critical length $L_{s2}$ for which the head loss between the ends of the sector reaches the reference value.

Between sectors the installation includes a station (62) with a decanting pool (63) containing liquid nitrogen at 77K and at pressure of one bar. A pump (64) circulates nitrogen from the decanting tank (63). The recompressed nitrogen flowrate is controlled by a float type device.

The first sector, near the liquefier (1), initially receives a maximum upstream flowrate m$_4$ producing the maximum permitted head loss Æp. Then, when the direction of flow has been reversed, the first sector receives a reduced flowrate (a.m$_4$) producing a heating effect of 0.5 Ætmax.

This variant is particularly advantageous. In each expansion station (62) the total expanded flowrate remains in the liquid state and is recompressed at the entry to the next sector. The tank (63) containing the bath of nitrogen at 77K and at atmospheric pressure can be minimized.

Figure 12:
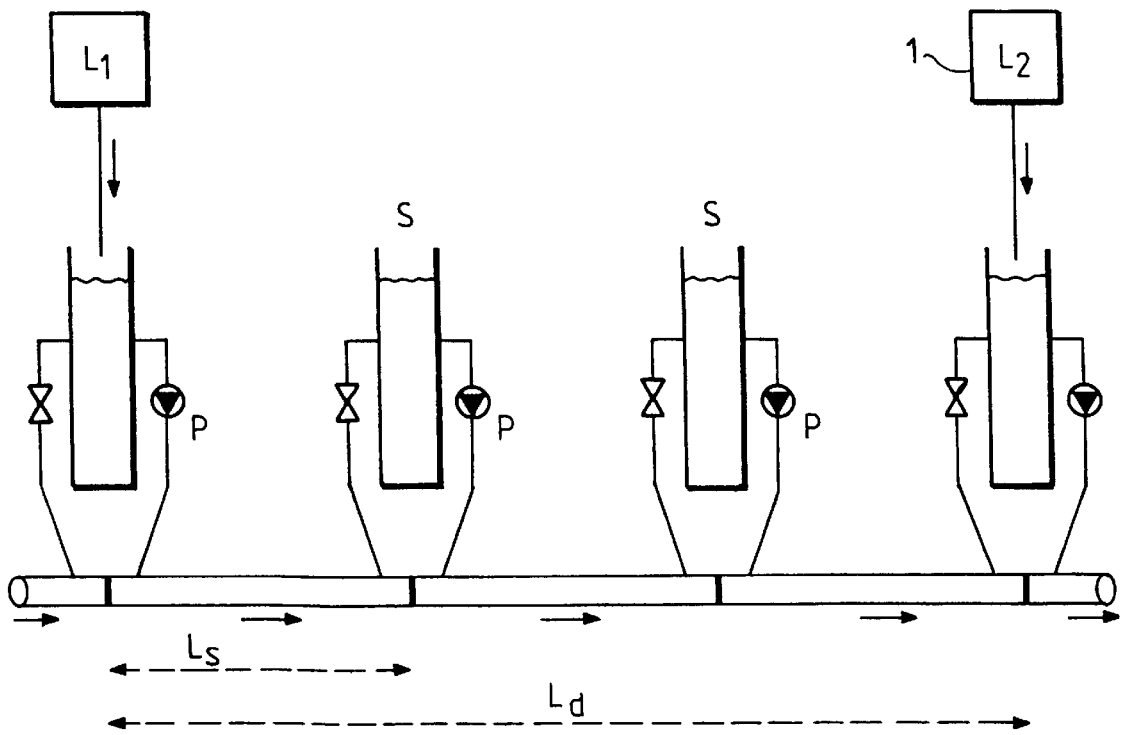
FIG. 12 is a diagrammatic view of a link with a single pipe, without flow reversal, and with distributed expansion.

FIG. 12 is a diagrammatic representation of a link with a single pipe, without flow reversal, and with distributed expansion.

Each section is divided into sectors as in the previous variant. At the downstream end of each section a liquefier (1) adds the top-up flowrate (1–a) .m$_5$ to the final flowrate a.m$_5$ of that section, the combination feeding the next section.

The final section of the link has a tank at the end with periodic reversal of the flowrate or a second pipe for the return flow of liquid nitrogen.

When there is a plurality of interconnected links, the flow of liquid nitrogen can be re-used for another link connected to the same node. This final section can be eliminated if a plurality of links with a single pipe are adjacent or disposed in a loop.

This variant avoids the duplication of cold pumps and expansion units needed when the flow is reversed. On the other hand, the increase in length is less, in the order of 14.5 times compared to the reference installation.

Figure 13:
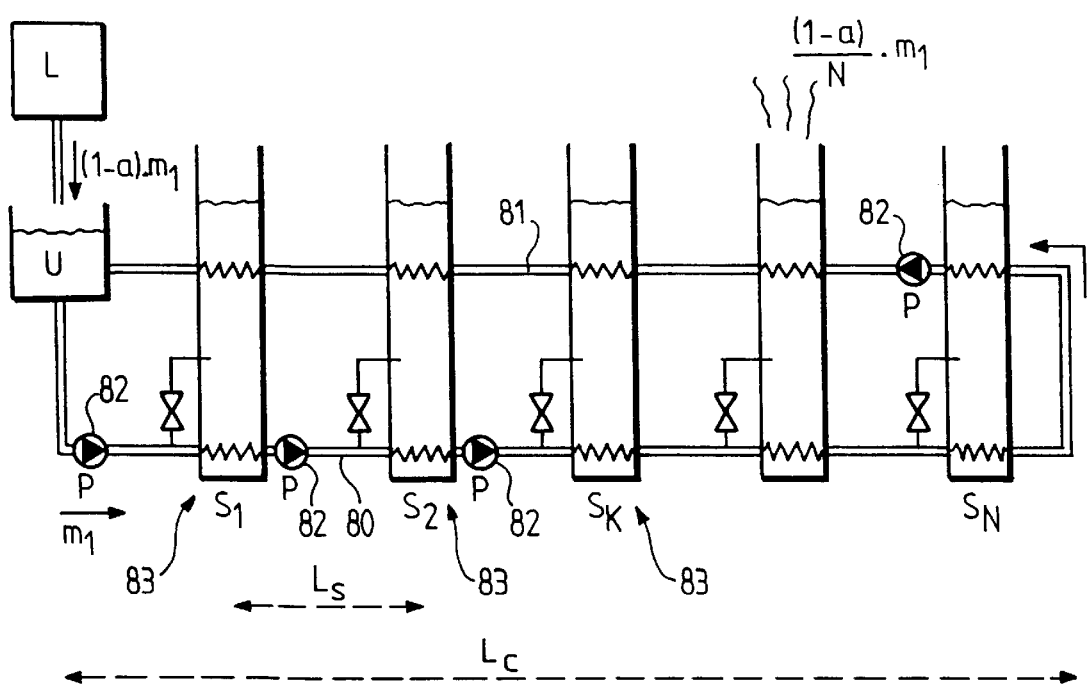
FIG. 13 is a diagrammatic view of a link with distributed draw-off stations and pressurization.

FIG. 13 is a diagrammatic representation of a link with distributed draw-off and pressurization stations.

This variant of the installation uses two pipes (80, 81) with global expansion. Each draw-off station (83) includes a pump for raising the pressure of the liquid nitrogen that is not drawn off.

The pumps (82) can pressurize a plurality of consecutive sectors in the downstream part of the go pipe (80) and above all along the return pipe (81) carrying a reduced flowrate.

The invention is described hereinabove by way of non-limiting example.

The variants described are all intended to allow maximum spacing of the liquefiers for maintaining the low temperature of a cryolink using liquid nitrogen.

The above variants are all based on reducing the temperature of the remaining flow, associated with eliminating successive parts of the total flow. Ejection is effected in the gas phase in stations separating successive sectors of the same section.

The pressurized liquid nitrogen is expanded to atmospheric pressure using JOULE-THOMSON valves to produce a bath of liquid nitrogen at 77K in each station. A variant would entail expanding the nitrogen using a turbine and extracting mechanical power.

Installations in accordance with the invention can be classified into two families.

The first family comprises installations in which approximately 10% of the flow of liquid is drawn off and expanded. A heat exchanger is then used to cool the flow that is not drawn off by boiling the portion of the nitrogen drawn off that remains in liquid form after the JOULE-THOMSON expansion.

The second family comprises installations in which all of the incoming flow of liquid is expanded to atmospheric pressure, which assures that the recompressed part feeding the subsequent sector(s) has the initial temperature of 77K. This eliminates the exchanger. On the other hand, cold pumps must be used to recompress the liquid nitrogen.

The skilled person will be able to envisage various variants that do not depart from the scope of the invention.

In particular, the nitrogen can be drawn off using a pump or a turbo-compressor creating a pressure less than atmospheric pressure and therefore a temperature less than 77K, which improves the performance of the cable and/or increases the distance between draw-off points.

What is claimed is:

1. A method of maintaining a superconducting cryolink at low temperature by means of a flow of liquid nitrogen produced by a liquefier feeding an upstream end of a link section, wherein the section is fed by only a single liquefier, and wherein only a portion of the nitrogen is drawn off from at least one intermediate point of the link section.

2. The method of maintaining a superconducting cryolink at low temperature according to claim 1, wherein nitrogen is drawn off in the link section, which includes a go pipe and a return pipe, by means of a plurality of draw-off stations which are spaced along the link section, and each of which includes a heat exchanger for cooling both the go and return pipes.

3. The method of maintaining a superconducting cryolink at low temperature according to claim 2, wherein the go and return pipes are separated in an upstream part of the section and grouped together at a downstream end of the section.

4. The method of maintaining a superconducting cryolink at low temperature according to claim 1,
   wherein nitrogen is drawn off at a point upstream of the section, and
   wherein a bath of liquid nitrogen is maintained around a heat exchange wall surrounding the link section.

5. The method of maintaining a superconducting cryolink at low temperature according to claim 1, wherein nitrogen is drawn off at a plurality of points distributed along the section which comprises a single pipe through which the liquid nitrogen flows, and wherein the direction of flow of the liquid nitrogen is periodically reversed.

6. The method of maintaining a superconducting cryolink at low temperature according to claim 1, wherein the pressure of the liquid nitrogen at said upstream end is substantially equal to 10 bars.

7. Equipment for transporting electric power via a superconducting cables, comprising: a pipe, surrounding the superconducting cable, for circulating a heat-conveying fluid at very low temperature sufficient to maintain the cable in a superconducting state; and
   a liquefier for feeding said pipe at an upstream end thereof,
   the equipment further comprising at least one draw-off device drawing off some of the heat-conveying fluid, downstream of the liquefier, to cool the fluid.

8. The equipment for transporting electric power by means of a superconducting cable according to claim 7, the equipment including a plurality of draw-off devices which are spaced along the pipe, and each of which comprises a heat exchanger for cooling the fluid.

9. The equipment for transporting electric power by means of a superconducting cable according to claim 7, wherein the pipe has a draw-off orifice, in a downstream part thereof, fitted with a valve controlled by means for controlling a level of the drawn off heat-conveying fluid, said orifice communicating with a tubular member surrounding the pipe and having an orifice for ejecting the gaseous fluid at its upstream end.

10. The equipment for transporting electric power by means of a superconducting cable according to claim 7, where the fluid is liquid nitrogen, the equipment further comprising means for reversing the direction of the flow of the liquid nitrogen.

11. A method of maintaining a superconducting cable at a sufficiently low temperature to maintain the cable in a superconducting state, comprising the steps of:
    placing the cable in a pipe having a length and having an upstream end and a downstream end;
    feeding, into only the upstream end of a pipe, liquid nitrogen from only a single supply of liquid nitrogen, and at said temperature sufficiently low to maintain the cable in the superconducting state; and
    at each of a plurality of points spaced along the length of the pipe, drawing off only a portion of the liquid nitrogen and expanding the liquid nitrogen in heat-exchanging relationship with the pipe to cool the liquid nitrogen in said pipe, in a region of said each point, to said sufficiently low temperature.

* * * * *